(12) United States Patent
Su et al.

(10) Patent No.: US 9,813,989 B2
(45) Date of Patent: Nov. 7, 2017

(54) POWER REDUCTION TECHNIQUES FOR DUAL-SIM DEVICES

(71) Applicant: Apple Inc., Cupertino, CA (US)

(72) Inventors: Li Su, San Jose, CA (US); Jianxiong Shi, Dublin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/009,992

(22) Filed: Jan. 29, 2016

(65) Prior Publication Data

US 2016/0234782 A1 Aug. 11, 2016

Related U.S. Application Data

(60) Provisional application No. 62/112,676, filed on Feb. 6, 2015.

(51) Int. Cl.
| | |
|---|---|
| *H04W 4/00* | (2009.01) |
| *H04W 52/02* | (2009.01) |
| *H04W 36/36* | (2009.01) |
| *H04W 36/38* | (2009.01) |
| *H04W 8/18* | (2009.01) |

(52) U.S. Cl.
CPC ......... *H04W 52/0229* (2013.01); *H04W 8/18* (2013.01); *H04W 36/365* (2013.01); *H04W 36/38* (2013.01); *Y02B 60/50* (2013.01)

(58) Field of Classification Search
None
See application file for complete search history.

(56) References Cited

U.S. PATENT DOCUMENTS

| | | |
|---|---|---|
| 8,805,444 B2 | 8/2014 | Han et al. |
| 9,131,475 B2 | 9/2015 | Gude et al. |
| 2009/0040992 A1* | 2/2009 | Hwang .............. H04W 60/00 370/338 |
| 2009/0238117 A1* | 9/2009 | Somasundaram ... H04J 11/0093 370/328 |
| 2010/0331019 A1* | 12/2010 | Bhattacharjee ... H04W 52/0229 455/458 |
| 2012/0225651 A1* | 9/2012 | Rysgaard ............ H04W 60/005 455/435.1 |

(Continued)

FOREIGN PATENT DOCUMENTS

CN 101217743 A 7/2008

*Primary Examiner* — German J Viana Di Prisco
(74) *Attorney, Agent, or Firm* — Meyertons Hood Kivlin Kowert & Goetzel, P.C.; Jeffrey C. Hood; Michael B. Davis

(57) ABSTRACT

Techniques are disclosed relating to reducing power consumption in dual-SIM devices. In some embodiments, a UE includes at least two SIMs, including a home SIM and a configurable SIM. In this embodiment, the UE is configured to register, using a first protocol stack, the configurable SIM with a local network. In these embodiments, the UE is configured to determine if the local network is an available network for the home SIM. In these embodiments, the UE is configured to register, using the first protocol stack, the home SIM with the local network in response to determining that the local network is an available network for the home SIM. In these embodiments, the UE is configured to monitor, using the first protocol stack, for pages for each of the home SIM using the identifier of the home SIM and the configurable SIM using the identifier of the configurable SIM.

20 Claims, 7 Drawing Sheets

(56) References Cited

U.S. PATENT DOCUMENTS

| | | | |
|---|---|---|---|
| 2012/0289193 A1* | 11/2012 | Bergenwall | H04W 12/12 |
| | | | 455/410 |
| 2013/0029637 A1* | 1/2013 | Hillier | H04W 8/26 |
| | | | 455/411 |
| 2015/0065132 A1 | 3/2015 | Ramkumar et al. | |
| 2015/0245309 A1* | 8/2015 | Nayak | H04W 60/005 |
| | | | 455/435.3 |
| 2015/0257100 A1 | 9/2015 | Su | |
| 2016/0007370 A1* | 1/2016 | Kotreka | H04W 72/1215 |
| | | | 370/329 |
| 2016/0050626 A1* | 2/2016 | Chen | H04W 24/00 |
| | | | 370/311 |
| 2017/0150545 A1* | 5/2017 | Ramkumar | H04W 76/026 |

* cited by examiner

POWER REDUCTION TECHNIQUES FOR DUAL-SIM DEVICES

PRIORITY CLAIM

This application claims the benefit of U.S. Provisional Application No. 62/112,676, filed on Feb. 6, 2015, which is incorporated by reference herein in its entirety.

TECHNICAL FIELD

The present application relates to wireless devices, and more particularly to a system and method for operating Dual SIM Dual Standby (DSDS) devices.

DESCRIPTION OF THE RELATED ART

Wireless communication systems are rapidly growing in usage. Further, wireless communication technology has evolved from voice-only communications to also include the transmission of data, such as Internet and multimedia content. In order to enable their wireless device to access a wireless communication network (e.g., a cellular telecommunication network) which provides such services, a user may in some cases be required to subscribe to a service provider (a "carrier"), who in turn may provide such services to the user, e.g., via a wireless communication network which they operate.

Such subscribers in a wireless communication network are typically assigned subscriber identity information, which may for example be stored as part of a subscriber identity module (SIM) in the subscriber's wireless device. For example, a commonly-used type of subscriber identity information is an International Mobile Subscriber Identity (IMSI), which identifies a subscriber's wireless device in their carrier's network. For subscribers to roam outside of their home network, their carrier may negotiate roaming agreements with other network operators so the visited network recognizes the subscriber's identity and allows roaming to proceed.

A user equipment device (UE), e.g., a wireless device such as a cellular phone, may be capable of using multiple subscriber identity modules (SIMs). For example, a Dual SIM Dual Standby (DSDS) UE may comprise a single transmitter that may be shared between SIMs and one or more receivers. In some UEs, one SIM may be a "home SIM" configured to communicate via a home network or roaming networks (e.g., based on roaming agreements. In these UEs, the other SIM may be a configurable SIM that the UE may program with subscriber identity information to communicate on local networks other than the home network. For example, a user that is travelling may be presented with the option to purchase service via another carrier, which may allow the user to download subscriber information for the carrier and communicate on the carrier's network as if it was a local network, rather than a roaming network. In some situations, to reduce communication costs, the home SIM is used on a roaming network for circuit-switched (CS) communications while the configurable SIM is used on a local network (which may or may not be the same network as the roaming network) for packet-switched (PS) communications. U.S. patent application Ser. No. 13/648,343 filed Oct. 10, 2012 and titled "Location-based Update of Subscriber Identity Information in a Wireless Device," for example, describes exemplary techniques for configuring a SIM to communicate using a local network other than a home network.

In various situations, a UE may execute a protocol stack for each SIM, which may increase power consumption. Each stack may independently schedule background public land mobile network (PLMN) scans and neighbor cell detection and measurements, which may effectively double the power consumption for these actions relative to single-SIM devices. Power consumption is typically a key performance indicator for UEs, especially in idle mode. Therefore, improvements in the field are desired.

SUMMARY

Embodiments described herein relate to techniques for reducing power consumption in dual-SIM devices.

In some embodiments, an apparatus includes one or more processing elements for operating in conjunction with at least two subscriber identity modules (SIMs) including a home SIM and a configurable SIM. In some embodiments, the apparatus is configured to register, using a first protocol stack, the configurable SIM with a local network using an identifier of the configurable SIM. In some embodiments, the apparatus is configured to determine if the local network is an available network for the home SIM. In some embodiments, the apparatus is configured to register, using the first protocol stack, the home SIM with the local network in response to determining that the local network is an available network for the home SIM. In some embodiments, determining that the local network is an available network for the home SIM causes automatic registration of the home SIM with the local network and the registering uses the identifier of the home SIM. In some embodiments, the apparatus is configured to monitor, using the first protocol stack, for pages for each of the home SIM using the identifier of the home SIM and the configurable SIM using the identifier of the configurable SIM.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the embodiments is considered in conjunction with the following drawings.

Figure 1:
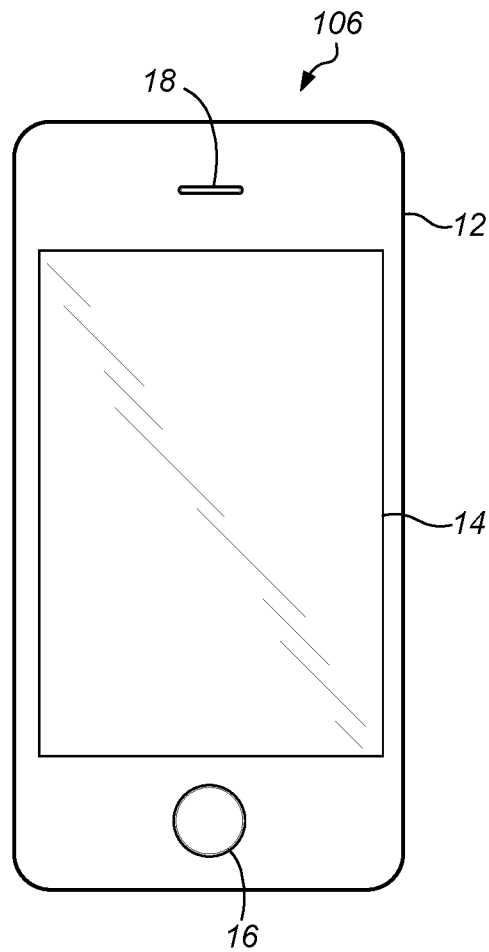
FIG. 1 illustrates an example user equipment (UE) according to some embodiments.

While the embodiments described in this disclosure may be susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION OF THE EMBODIMENTS

Figure 6:
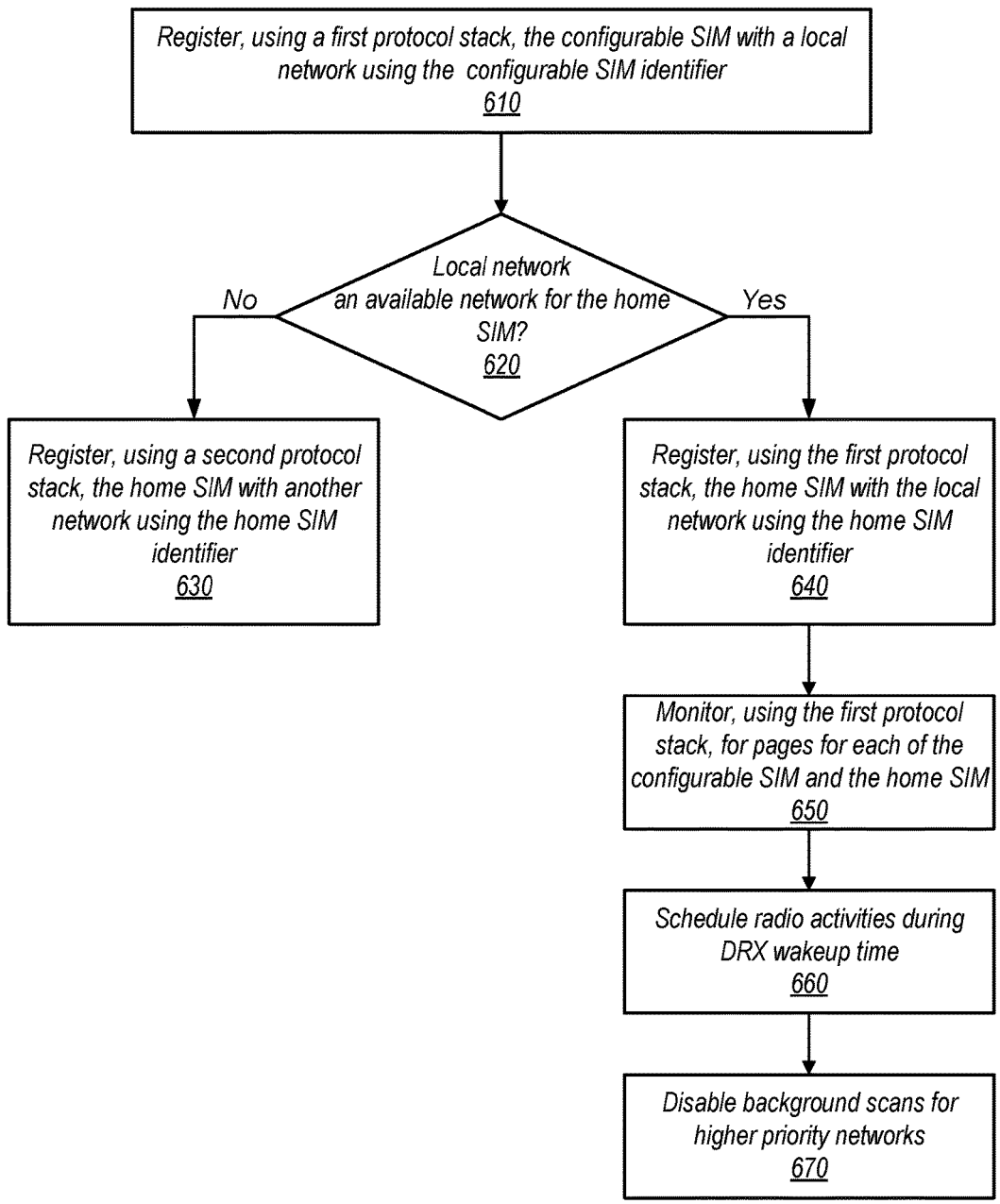
FIG. 6 is a flowchart illustrating an exemplary method, according to some embodiments.
Figure 7:
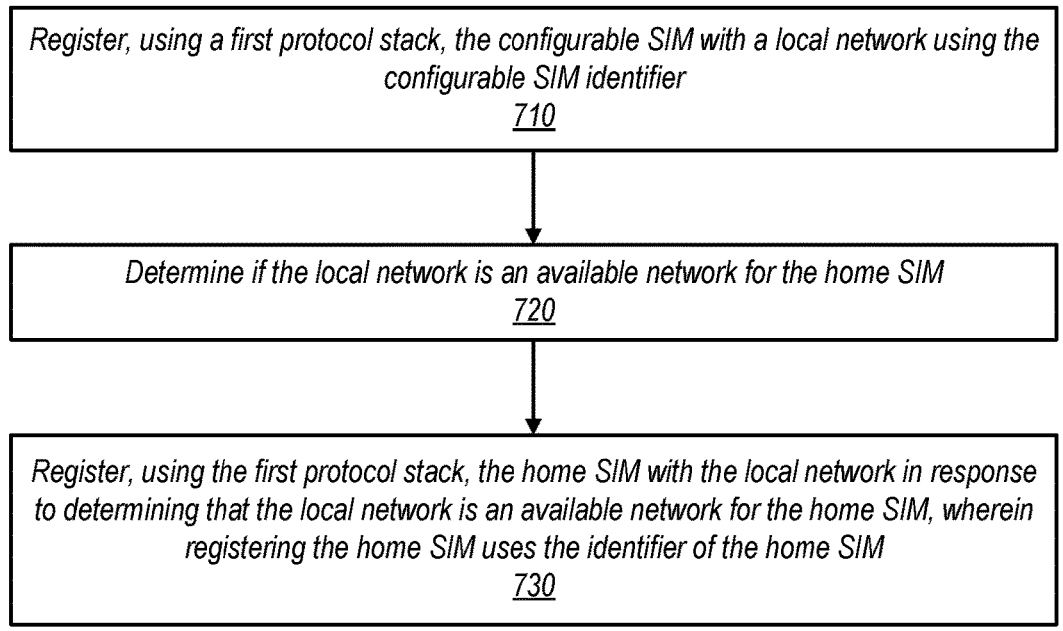
FIG. 7 is a flowchart illustrating another exemplary method, according to some embodiments.

This disclosure initially lists relevant acronyms and a glossary. It then describes, with reference to FIGS. 1-5, exemplary embodiments of a mobile device configured to communicate using multiple Subscriber Identity Modules (SIMs) and different radio access technologies (RATs). Exemplary method for operating using different SIMs is shown in FIGS. 6-7. In some embodiments, a mobile device may steer registration of a home SIM to the network on which a configurable SIM is registered and may execute a single protocol stack for various activities for both the home SIM and the configurable SIM. In some embodiments, this may significantly reduce power consumption, relative to using separate protocol stacks and/or separately scheduling activities for the different SIMs.

ACRONYMS

The following acronyms are used in the present disclosure.

3GPP: Third Generation Partnership Project
3GPP2: Third Generation Partnership Project 2
BER: Bit Error Rate
CDMA: Code Division Multiple Access
CPTR: Common Periodic Time Reference
DDR: Double Data Rate
EVM: Error Vector Magnitude
FFT: Fast Fourier Transform
FPGA: Field Programmable Gate Array
GSM: Global System for Mobile Communications
LTE: Long Term Evolution
MIMO: Multiple Input Multiple Output
MRT: Maximum Radio Transmission
OFDM: Orthogonal Frequency-Division Multiplexing
PER: Packet Error Rate
PCIe: Peripheral Component Interconnect Express
PLMN: Public Land Mobile Network
PXIe: PCI eXtensions for Instrumentation Express
RAT: Radio Access Technology
RX: Receive
SDR: Software Defined Radio
SRP: Software Radio Peripheral
TX: Transmit
UE: User Equipment
UMTS: Universal Mobile Telecommunications System
WCDMA: Wideband Code Division Multiple Access
ZF: Zero Forcing

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to some embodiments. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), LTE Advanced (LTE-A), and/or other RATs. For example, the UE 106 may support at least two radio access technologies such as LTE and GSM. Various different or other RATs may be supported as desired.

The UE 106 may comprise at least two antennas. The UE 106 may also comprise any of various radio configurations, such as various combinations of one or more transmitter chains (TX chains) and two or more receiver chains (RX chains). For example, the UE 106 may comprise two radios that may each support one or more RATs. The two radios may each comprise a single TX (transmit) chain and a single RX (receive) chain. Alternatively, the two radios may each comprise an RX chain and may share a single TX chain.

In the embodiment described herein, the UE 106 comprises two antennas, which communicate using two or more RATs. For example, the UE 106 may have a pair of cellular telephone antennas, where each antenna is coupled to a respective single radio. Where two radios share a single TX chain, the antennas may be coupled to the shared portions of the radios (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The second antenna may also be coupled to the first TX chain. The first and second receiver chains may be independent in frequency to allow for simultaneous voice calls on each of the two radios. The first and second receiver chains may additionally share a common local oscillator, which means that both of the first and second receiver chains are capable of tuning to the same frequency.

In some embodiments, each radio may time multiplex among two or more RATs, such as LTE and one or more other RATs such as GSM or CDMA1×. In the primary embodiment described herein the UE 106 comprises one transmitter chain and two receiver chains.

Each antenna may receive a wide range of frequencies such as from 600 MHz up to 3 GHz. Thus, for example, the local oscillator of one receiver chain may tune to a specific frequency such as an LTE frequency band. The wireless circuitry in the UE 106 may be configured in real time depending on the desired mode of operation for the UE 106. In the example embodiment described herein, the UE 106 is configured to support LTE, W-CDMA (W), TDS-CDMA (T) and GSM (G) radio access technologies.

In some embodiments, the UE 106 comprises two or more subscriber identity modules (SIMs), which each support one or more RATs.

Figure 2:
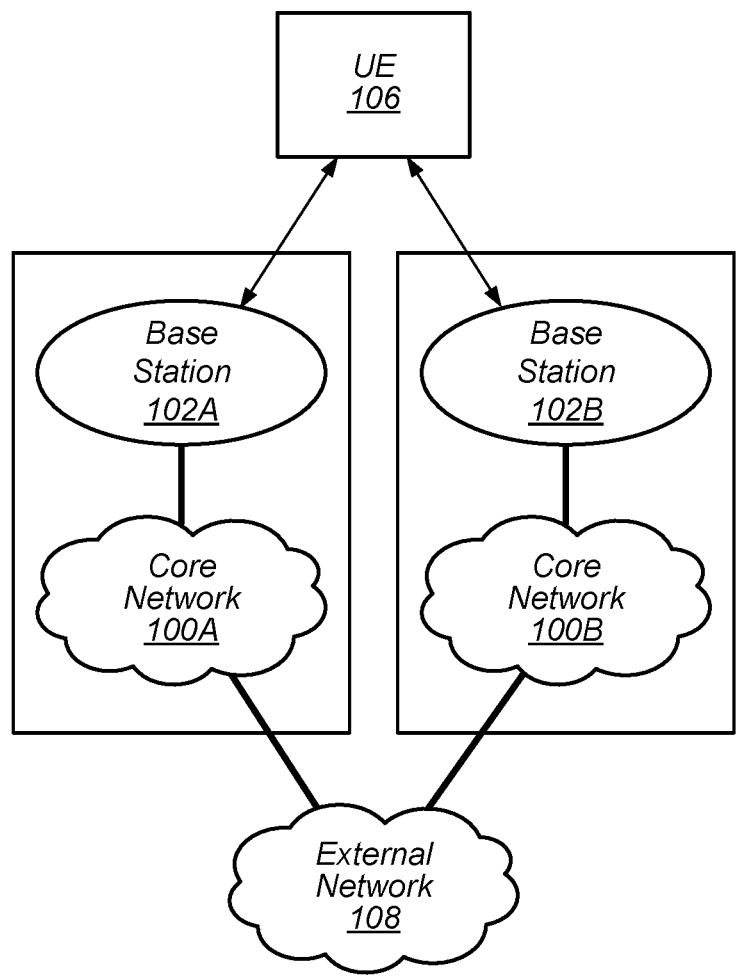
FIG. 2 illustrates an example wireless communication system where a UE communicates with two base stations.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various RATs (also referred to as wireless communication technologies or telecommunication standards), such as LTE, W-CDMA, TDS-CDMA, and GSM, among possible others such as UMTS, LTE-A, CDMA2000 (e.g., 1×RTT, 1×EV-DO, HRPD, eHRPD), etc.

Base station 102A and core network 100A may operate according to a first RAT (e.g., LTE) while base station 102B and core network 100B may operate according to the same RAT or a second (e.g., different) RAT (e.g., GSM). The two core networks may be controlled by the same network operator (e.g., cellular service provider or "carrier"), or by different network operators, as desired. In addition, the two core networks may be operated independently of one another (e.g., if they operate according to different RATs), or may be operated in a somewhat coupled or tightly coupled manner.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
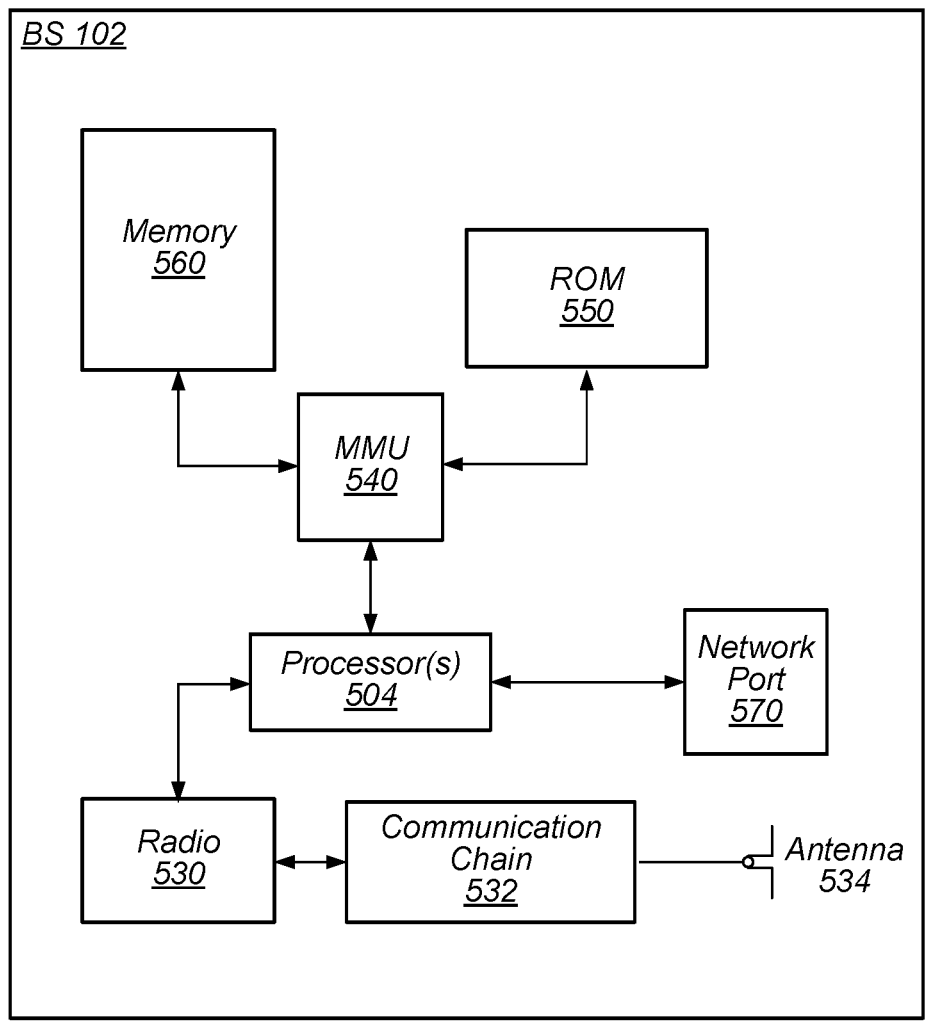
FIG. 3 is an example block diagram of a base station, according to some embodiments.

FIG. 3—Base Station

FIG. 3 illustrates an exemplary block diagram of a base station 102. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
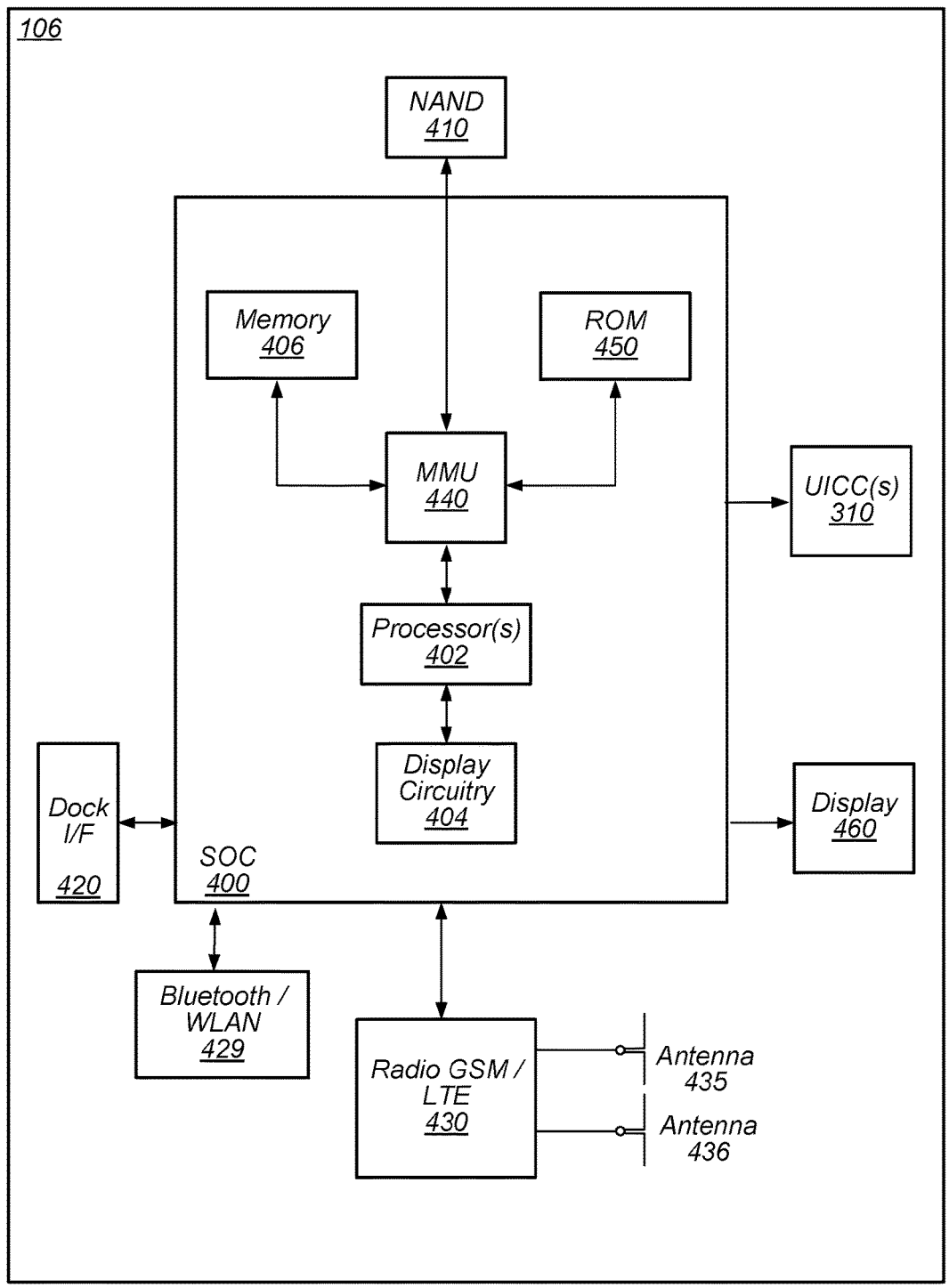
FIG. 4 is an example block diagram of a UE, according to some embodiments.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth and WLAN circuitry). The UE 106 may further comprise two or more smart cards 310 that each comprise SIM (Subscriber Identity Module) functionality, such as two or more UICC(s) (Universal Integrated Circuit Card(s)) 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In some embodiments, as noted above, the UE 106 comprises at least one smart card 310, such as a UICC 310, which executes one or more Subscriber Identity Module (SIM) applications and/or otherwise implement SIM functionality. In some embodiments, UE 106 includes two or more smart cards 310. Each one of SIM smart cards 310 may be embedded, e.g., may be soldered onto a circuit board or included in an integrated circuit in the UE 106, or each one of SIM smart cards 310 may be implemented as a removable smart card. Thus the smart card(s) 310 may be removable smart cards (such as UICC cards, which are sometimes referred to as "SIM cards"), and/or the smart card(s) 310 may be embedded cards (such as embedded UICCs (eUICCs), which are sometimes referred to as "eSIMs" or "eSIM cards"). In some embodiments (such as when the smart card(s) 310 include an eUICC), one or more of the SIM(s) 310 may implement embedded SIM (eSIM) functionality. In such an embodiment, one of the smart card(s)

310 may execute multiple SIM applications. Each of the smart card(s) 310 may include components such as a processor and a memory. Instructions for performing SIM/eSIM functionality may be stored in the memory and executed by the processor. In some embodiments, the UE 106 may comprise a combination of removable smart cards and fixed/non-removable smart cards (such as one or more eUICC cards that implement eSIM functionality), as desired. For example, the UE 106 may comprise two embedded smart cards 310, two removable smart cards 310, or a combination of one embedded smart card 310 and one removable smart card 310. Various other SIM configurations are also contemplated.

The inclusion of two or more SIM smart cards 310 in embodiments of UE 106 may allow the UE 106 to support two different telephone numbers and may allow the UE 106 to communicate on corresponding two or more respective networks. For example, a first smart card 310 may comprise SIM functionality to support a first telephone number on the UE, and a second smart card 310 may comprise SIM functionality to support a second telephone number on the UE. Where the UE 106 comprises two smart cards 310, the UE 106 may support Dual SIM Dual Standby (DSDS) functionality. The DSDS functionality may allow the UE 106 to be connected to a first network performing a first active call and to receive a second call at the same time. Thus the DSDS functionality may allow either or both of the two smart cards 310 in the UE 106 to be on standby waiting for a voice call and/or data connection. In some embodiments of DSDS, when a call/data is established on one SIM 310, the other SIM 310 is no longer active.

As noted above, the UE 106 may be configured to communicate wirelessly using multiple radio access technologies (RATs). As further noted above, in such instances, the cellular communication circuitry (e.g., radio(s)) 430 may include radio components which are shared between multiple RATs. In some embodiments, the cellular communication circuitry 430 may comprise two distinct radios, each having a receive chain and a transmit chain. In some embodiments, the two radios may support separate RAT stacks. Additionally, or alternatively, one or more of the RAT stacks may be capable of utilizing either radio.

The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein. In some embodiments, one or more processing elements of the UE device may be manufactured and/or sold separately from the UE device, but may be configured to perform various functionality described herein.

Figure 5:
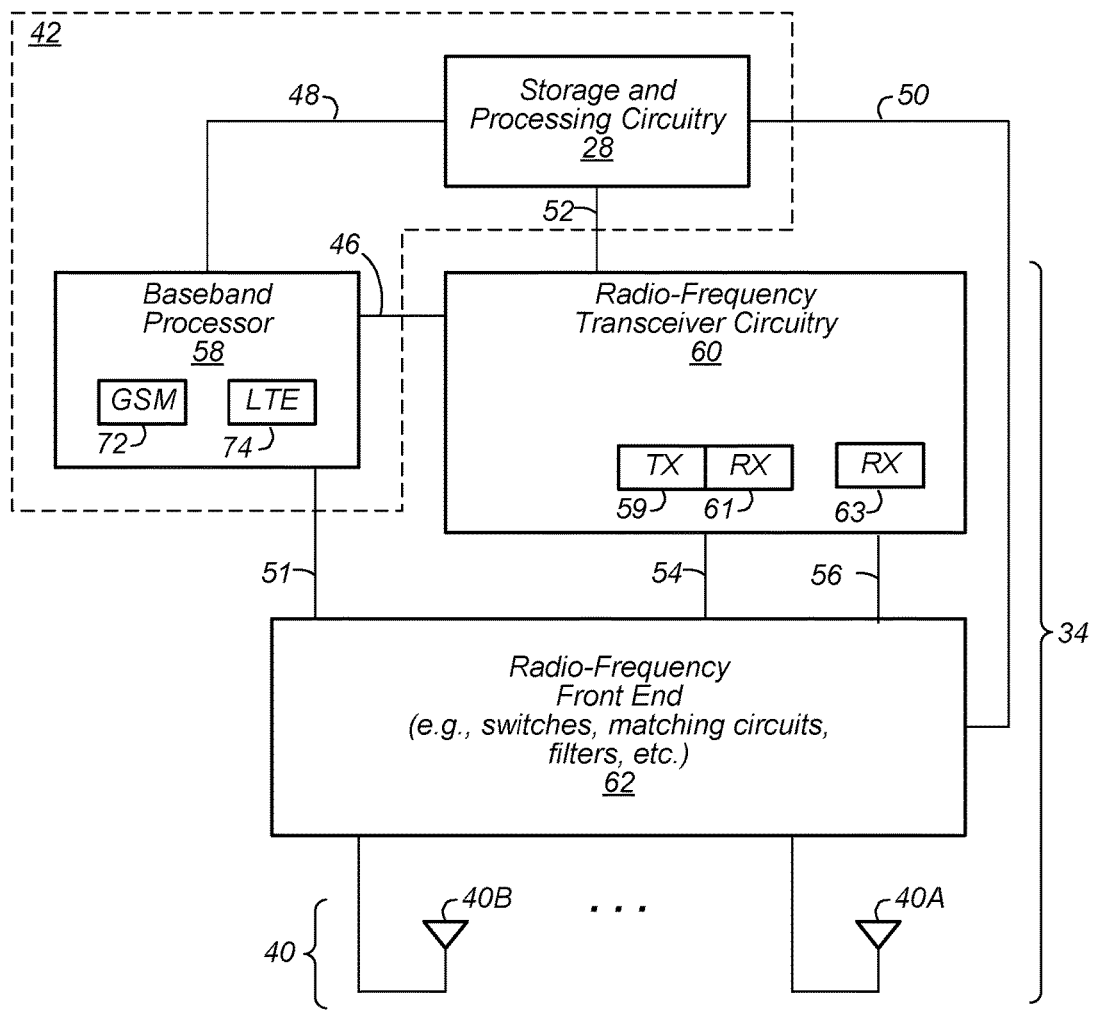
FIG. 5 is an example block diagram of wireless communication circuitry in the UE, according to some embodiments.

FIG. 5—UE Transmit/Receive Logic

FIG. 5 illustrates a portion of UE 106, according to some embodiments. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM protocol stack 72, LTE protocol stack 74, and/or 1× protocol stack (not shown), among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or baseband processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown, radio-frequency transceiver circuitry 60 comprises transceiver (TX) chain 59, receiver (RX) chain 61 and RX chain 63. The embodiment shown may be considered to comprise two radios, which share a single TX chain. Other embodiments are of course contemplated.

Overview of Exemplary Dual-SIM Operations

In some dual-SIM embodiments, one SIM is referred to as a "home SIM" while the other SIM is referred to as a "configurable SIM." In some embodiments, one or both of the SIMs are eSIMs. In a UE device with DR-DSDS (Dual RX-Dual SIM Dual Standby) capabilities, circuit-switched (CS) service is typically provided by the network registered with the home SIM. This network (network A) may be either a home network or a roaming network. To communicate via a roaming network, a roaming agreement with the non-home network operators may be required so that the visited network recognizes the subscriber's identity and allows roaming to proceed. In these embodiments, packet-switched (PS) service may be provided by network A using the home SIM if the configurable SIM is either not activated or not registered to another network.

The configurable SIM, in some embodiments, is programmable by the UE with subscriber identity information to communicate on local networks other than the home network. For example, a user that is travelling may be presented with the option to purchase service via another carrier, which may allow the user to download subscriber information for the carrier and communicate on the carrier's network as if it was a local network, rather than a roaming network. In these embodiments, if the configurable SIM is activated and registered to another network (network B) then PS service is typically provided by network B and the network registered with the home SIM provides CS service only. This solution may benefit roaming users (e.g., by reducing fees) when the configurable SIM is used to access PS data from a local network while the home SIM uses a roaming network. Because roaming PS service is typically expensive, the home SIM can use a roaming network for CS service while the PS service can be provided by a local network using the configurable SIM with a reduced cost.

Note that a network is described as a "local network" when a subscriber identity being used to access the network is associated with the carrier that provides service via the network. Thus, if the configurable SIM is programmed with a subscriber identity associated with a carrier providing service via a network, then that network is a local network for the configurable SIM. If the home SIM's subscriber identity is used to communicate on the same network, the network would be a roaming network from the home SIM's point of view because the home SIM's subscriber information is not associated with the carrier providing the service (assuming that the network is not the "home network," which is a network provided by a carrier associated with the home SIM subscriber identity). Thus, if a home SIM is described herein as communicating via the local network of the configurable SIM, it is to be understood that the term "local" is used for reference to facilitate identification of the relevant network, but that the network is actually a home or roaming network for communications that use the home SIM's subscriber identity.

A "roaming network" is a network for which the relevant subscriber identity is not associated with the carrier providing service via the network. Typically, a roaming agreement has been negotiated between the carrier associated with the subscriber identity and the carrier providing service via the roaming network.

In one conventional roaming scenario, the home SIM is registered with network A and may operate in conjunction with a multi-mode protocol stack (stack 1) and an independent RF receiver (RX1). In this scenario, stack 1 will provide only CS service. The configurable SIM is registered with network B, and may operate in conjunction with another multi-mode protocol stack (stack 2) and an independent RF receiver (RX2). In this scenario, stack 2 will provide only PS service. In some embodiments, both stacks use the single transmitter TX 59 to perform transmission activities.

Maintaining both multi-mode protocol stacks may consume considerable power, even when in idle mode. Idle mode power consumption is typically a key performance indicator for mobile devices. When one of the stacks is in GSM mode, (e.g., with a page cycle of 470 ms for some networks), the power consumption may be especially high. If the two stacks do not coordinate actions such as background PLMN scans and neighbor cell detection/measurement, power consumption may be effectively doubled for these activities, relative to executing a single protocol stack.

Therefore, in some embodiments, UE 106 is configured to steer the home SIM and the configurable SIM to use the same network (e.g., such that the roaming network used by the home SIM is that same network as the local network used by the configurable SIM). In some embodiments, UE 106 is configured to utilize a single protocol stack for communications using the home SIM and configurable SIM, which may significantly reduce idle power consumption in these embodiments. In some embodiments, UE 106 may also reduce or disable PLMN scans for the home SIM in this situation, which may reduce power consumption and/or keep the home SIM registered on the same network as the configurable SIM.

FIG. 6—Exemplary Method

FIG. 6 shows one exemplary embodiment of a method for reducing idle mode power consumption. The method shown in FIG. 6 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 610, UE 106 registers, using a first protocol stack, the configurable SIM with a local network using an identifier of the configurable SIM (e.g., an IMSI). This may be performed in response to user input selecting the local network, for example. In other situations, this may be performed automatically, e.g., based on changing coverage conditions and/or prior user configuration. The first protocol stack may be a multi-mode protocol stack and may be configured for communication via GSM, WCDMA, and/or LTE, etc.

At 620, UE 106 determines whether the local network is available for the home SIM. In some embodiments, this includes determining whether a roaming agreement exists between a home network operator and an operator of the local network. If the local network is available for the home SIM, the flow proceeds to 640, otherwise the flow proceeds to 630.

At 630, UE 106 registers the home SIM with another network (other than the local network with which the configurable SIM is registered) using a second protocol stack and a home SIM identifier (e.g., an IMSI). Using the second protocol stack may result in greater power consumption, relative to proceeding to 640, in some embodiments.

At 640, UE 106 registers, using the first protocol stack, the home SIM with the local network using the home SIM identifier. In some embodiments and situations, the local network is one of multiple roaming networks available for the home SIM, e.g., based on a roaming network list stored for the home SIM. In some embodiments, UE 106 is configured to preferentially select the local network on which the configurable SIM is registered (e.g., instead of other more highly ranked networks) in order to allow registration for both the home SIM and the configurable SIM using the first protocol stack. Thus, the home SIM is steered to the network of the configurable SIM, in some embodiments. In some embodiments, UE 106 is configured to automatically register the home SIM with the local network in response to determining that the local network is an available roaming network for the home SIM. Using a single protocol stack for both SIMs may significantly reduce power consumption, in some embodiments and situations.

If the home SIM is registered on another roaming network prior to step 640, UE 106 may maintain idle discontinuous reception (DRX) cycles on the existing network using another protocol stack while the first protocol stack is used to register the home SIM with the local network. After registering the home SIM with the local network, UE 106 may cease executing the other protocol stack. At this point, communication for both SIMs may be occurring via the same RAT and protocol stack.

In some embodiments, the home SIM is configured to communicate using the local network (as a roaming network for the home SIM communication) for CS communications while the configurable SIM is configured to communicate using the local network for PS communications.

At 650, UE 106 monitors, using the first protocol stack, for pages for each of the configurable SIM and the home SIM. In some embodiments, the home SIM's IMSI is the primary IMSI used to monitor pages for voice service in idle DRX mode. In this embodiment, UE 106 is configured to schedule DRX wakeup time based on the home SIM's IMSI. In other embodiments, the configurable SIM's IMSI is the primary IMSI and UE 106 is configured to schedule DRX wakeup time based on the configurable SIM's IMSI.

DRX mode refers to a mode in which at least a portion of UE circuitry is powered down when there is no data (or voice) to be received. In DRX and connection mode DRX (CRDX) modes, the UE 106 synchronizes with the base station 102 and wakes up at specified times or intervals to listen to the network. DRX is present in several wireless standards such as UMTS, LTE (Long-term evolution), WiMAX, etc. The terms "DRX" and "CDRX" are explicitly intended to at least include the full extent of their ordinary meaning, and are also intended to encompass similar types of modes in future standards.

In some embodiments, UE 106 is configured to determine the configurable SIM's page location based on the configurable SIM's IMSI. Depending on whether the page location for the configurable SIM is in the DRX wakeup time, different techniques may be used to monitor for pages for the configurable SIM, for different RATs, as described in further detail below. Further, in embodiments in which the configurable SIM's IMSI is used as the primary IMSI and used to schedule DRX wakeup time, the techniques described below with reference to paging for the configurable SIM may be utilized for paging for the home SIM.

Generally, in some embodiments, if the page location for the configurable SIM is in the DRX wakeup time, monitoring for the paging for the configurable SIM is performed in the DRX wakeup time. Otherwise, in some embodiments, monitoring for paging for the configurable SIM is scheduled to reduce wakeup time. For example, UE 106 may be configured to perform decoding of the page for the configurable SIM offline to reduce wakeup time.

For LTE, in some embodiments, if the configurable SIM and home SIM page block is at the same location, a single page block is transmitted by the network and both IMSIs are listed on the same page message. Thus, in some embodiments, base station 102 is configured to determine that page blocks for different SIMs are at the same location and list IMSIs for the different SIMs on the same page message. Otherwise, in these embodiments, the configurable SIMs page block is received in a Physical Downlink Shared Channel (PDSCH) with a specific page Radio Network Temporary Identifier (RNTI).

For WCDMA, in some embodiments with a rake receiver, for a High-Speed Downlink Packet Access (HSDPA) call (which may use equalization demodulation instead of a rake receiver), there are enough branches of the rake receiver (also referred to as "fingers") for WCDMA to demodulate/dechannelize the Paging Indication Channel (PICH) and Secondary Common Control Physical Channel (SCCPCH) and decode the Paging Channel (PCH) block while in HSDPA reception.

For WCDMA, in some embodiments with a rake receiver, for a Dedicated Physical Channel (DPCH) call, if there are enough branches left after assigning a branch per active cell, the extra branches may be similarly used for PICH and SCCPCH dechannelization. If there are not enough branches left after assigning a branch per active cell, in some embodiment's, UE 106 is configured to suspend DPCH data decoding in order to decode PICH and SCCPCH for the page location of the configurable SIM, then resume DPCH decoding after the PICH and SCCPCH have been decoded.

For other RATs, in various embodiments, any of various techniques may be used to schedule the non-primary SIM's paging wakeup times.

At 660, UE 106 schedules various radio activities during DRX wakeup time. These activities may include intra/inter RAT neighbor cell detection and measurements, for example. Scheduling these activities during DRX wakeup time may reduce power consumption, in some embodiments.

At 670, UE 106 disables background scans for higher priority networks. For example, UE 106 may disable PLMN background scans. In some embodiments, the scans may not be completely disabled, but transfer to higher priority PLMNs may be avoided in order to camp the home SIM on the network utilized by the configurable SIM. For example, UE 106 may not register the home SIM on PLMNs that are higher priority on the home SIM network carrier's preferred PLMN lists than the local network in order to camp the home SIM.

If UE 106 is in idle DRX mode and a page is received for a CS call or CS domain SMS, for example, UE 106 may accept the call using the roaming network (which is the same network as the local network on which the configurable SIM is used to send/receive data).

FIG. 7—Exemplary Method

FIG. 7 shows one exemplary embodiment of a method for using a single protocol stack to register multiple SIMs on an network. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 710, an apparatus registers, using a first protocol stack, a configurable SIM with a local network using an identifier of the configurable SIM.

At 720, the apparatus determines if the local network is an available network for a home SIM.

At 730, the apparatus registers the home SIM with the local network in response to determining that the local network is an available network for the home SIM. The registration may use an identifier of the home SIM. Step 730 is performed automatically, in some embodiments, in response to registration of the configurable SIM and/or in response to determining that the local network is an available network for the home SIM.

Using the same protocol stack to register both the configurable SIM and the home SIM may significantly reduce power consumption in situations where the same network is usable by both SIMs, relative to using different protocol stacks for registration of the different SIMs. In various embodiments, steering the home SIM to the same network as the configurable SIM (or vice versa) may further reduce power consumption by increasing the time during which a single protocol stack is used for both SIMs.

The techniques disclosed herein may significantly reduce power consumption when using a single RAT, at least because of the single protocol stack, the coordinated and reduced DRX wakeup cycle, and/or reduced neighbor cell detection and measurement. This may in turn result in improved battery life for UE 106 relative to UEs that do not utilize the disclosed techniques.

Embodiments described in this disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   one or more processing elements for operating in conjunction with at least two subscriber identity modules (SIMs) comprising a home SIM and a configurable SIM, wherein the one or more processing elements are configured to:
      register, using a first protocol stack, the configurable SIM with a local network using an identifier of the configurable SIM;
      determine if the local network is an available network for the home SIM;
      register, using the first protocol stack, the home SIM with the local network in response to determining that the local network is an available network for the home SIM, wherein registering the home SIM uses the identifier of the home SIM; and
      monitor, using the first protocol stack, for pages for each of the home SIM using the identifier of the home SIM and the configurable SIM using the identifier of the configurable SIM.

2. The apparatus of claim 1, wherein the apparatus is configured to execute the first protocol stack and no other protocol stacks for a radio access technology (RAT) associated with the first protocol stack during a time interval that begins with successful registration of the first protocol stack and ends subsequent to monitoring for pages for each of the home SIM and the configurable SIM.

3. The apparatus of claim 1,
   wherein the apparatus is a user equipment device (UE) that further comprises:
   at least two antennas;
   at least one transmitter;
   at least two receivers; and
   circuitry configured to receive or implement the home SIM and the configurable SIM.

4. The apparatus of claim 1,
   wherein the apparatus is further configured to:
      register, using a second, different protocol stack, the home SIM with a different network in response to determining that the local network is not an available network for the home SIM.

5. The apparatus of claim 1,
   wherein, for registration of the configurable SIM, the local network is selected in response to user input.

6. The apparatus of claim 1,
   wherein the apparatus is configured to monitor for pages for each of the home SIM and the configurable SIM on a DRX cycle having a DRX wakeup time, wherein the DRX wakeup time is scheduled based on the identifier of the home SIM.

7. The apparatus of claim 6,
   wherein the apparatus is configured to calculate a page monitoring location for the configurable SIM based on the identifier of the configurable SIM.

8. The apparatus of claim 7,
   wherein the calculated page monitoring location for the configurable SIM occurs during the DRX wakeup time, wherein decoding of pages of the configurable SIM occurs during the DRX wakeup time.

9. The apparatus of claim 7,
   wherein the calculated page monitoring location for the configurable SIM does not occur during the DRX wakeup time, wherein the apparatus is configured to schedule page monitoring at the calculated page monitoring location and is configured to perform offline decoding of the page to reduce wakeup time of the configurable SIM for page monitoring.

10. The apparatus of claim 1, wherein the apparatus is further configured to disable background scans for higher priority networks for the home SIM.

11. The apparatus of claim 1,
    wherein the apparatus is configured to execute a second protocol stack to maintain an idle DRX cycle on an existing network to listen for pages using an identifier of the home SIM until the UE registers the home SIM with the local network.

12. The apparatus of claim 1,
    wherein the configurable SIM is an eSIM; and
    wherein the local network is a roaming network for the home SIM.

13. The apparatus of claim 1, wherein one or more of the home SIM and the configurable SIM is an eSIM.

14. A non-transitory computer-readable medium having instructions stored thereon that are executable by a computing device to perform operations comprising:
    registering, using a first protocol stack, a configurable SIM of the computing device with a local network using an identifier of the configurable SIM;
    determining if the local network is an available network for a home SIM of the computing device;
    registering, using the first protocol stack, the home SIM with the local network in response to determining that the local network is an available network for the home SIM, wherein registering the home SIM uses the identifier of the home SIM; and
    monitoring, using the first protocol stack, for pages for each of the home SIM using the identifier of the home SIM and the configurable SIM using the identifier of the configurable SIM.

15. The non-transitory computer-readable medium of claim 14, wherein the operations further comprise:
    registering, using a second, different protocol stack, the home SIM with a different network in response to determining that the local network is not an available network for the home SIM.

16. The non-transitory computer-readable medium of claim 14, wherein, in registering the configurable SIM, the local network is selected in response to user input.

17. The non-transitory computer-readable medium of claim 14, wherein the operations further comprise:
disabling background scans for higher priority networks after registration of the home SIM.

18. The non-transitory computer-readable medium of claim 14, wherein the operations further comprise
executing a second protocol stack to maintain an idle DRX cycle on an existing network to listen for pages using an identifier of the home SIM until registration of the home SIM with the local network.

19. An apparatus, comprising:
one or more processing elements for operating in conjunction with at least two subscriber identity modules (SIMs) comprising a home SIM and a configurable SIM, wherein the one or more processing elements are configured to:
register, using a first protocol stack, the configurable SIM with a local network using an identifier of the configurable SIM, wherein the first protocol stack is a multi-mode protocol stack configured to support multiple radio access technologies (RATs);
determine if the local network is an available network for the home SIM; and
automatically register, using the first protocol stack, the home SIM with the local network in response to determining that the local network is an available network for the home SIM, wherein registering the home SIM uses the identifier of the home SIM.

20. The apparatus of claim 19, wherein the apparatus is further configured to disable background scans for higher priority networks after registration of the home SIM.

* * * * *